(12) United States Patent
Harduf et al.

(10) Patent No.: US 11,593,347 B2
(45) Date of Patent: Feb. 28, 2023

(54) TRANSIENT SOFTWARE ERROR HANDLING IN A DISTRIBUTED SYSTEM

(71) Applicant: EMC IP HOLDING COMPANY LLC, Hopkinton, MA (US)

(72) Inventors: Yuval Harduf, Yehud (IL); Chen Reichbach, Tel Aviv (IL); Shulamit Katz, Petach-Tikva (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 491 days.

(21) Appl. No.: 16/597,112

(22) Filed: Oct. 9, 2019

(65) Prior Publication Data
US 2021/0109914 A1    Apr. 15, 2021

(51) Int. Cl.
| | | |
|---|---|---|
| *G06F 16/00* | (2019.01) | |
| *G06F 16/23* | (2019.01) | |
| *G06F 16/21* | (2019.01) | |
| *G06F 13/16* | (2006.01) | |
| *G06F 13/42* | (2006.01) | |

(52) U.S. Cl.
CPC ...... *G06F 16/2365* (2019.01); *G06F 13/1668* (2013.01); *G06F 13/4221* (2013.01); *G06F 16/211* (2019.01); *G06F 2213/0036* (2013.01)

(58) Field of Classification Search
CPC .. G06F 13/1668; G06F 13/4221; G06F 16/11; G06F 16/211; G06F 16/2365; G06F 2213/0036
USPC .................................................. 707/600–899
See application file for complete search history.

(56) References Cited

U.S. PATENT DOCUMENTS

| | | | |
|---|---|---|---|
| 8,479,046 B1* | 7/2013 | Bailey ................. | G06F 11/1088 714/48 |
| 9,021,192 B1* | 4/2015 | Kang ................... | G06F 12/0253 711/100 |
| 2004/0064429 A1* | 4/2004 | Hirstius ................. | H04H 20/40 |
| 2005/0027718 A1* | 2/2005 | Sakaguchi .............. | G06F 16/10 |
| 2010/0011091 A1* | 1/2010 | Carver ................ | H04L 67/1097 709/219 |
| 2015/0278330 A1* | 10/2015 | Hawa ...................... | H04L 67/06 709/203 |
| 2018/0218022 A1* | 8/2018 | Mace ....................... | G06F 16/28 |

* cited by examiner

*Primary Examiner* — Michelle N Owyang
(74) *Attorney, Agent, or Firm* — Daly, Crowley Mofford & Durkee, LLP (57) ABSTRACT

A method for use in a storage system is disclosed, comprising: receiving, at a first server in the storage system, a given block layer request for reservation of a storage resource, by the first server, an identifier corresponding to the given block layer request; performing a search of a database to detect whether the given block layer request has been completed, the search being performed by the first server, the search being performed based on the identifier corresponding to the given block layer request; when the database indicates that the given block layer request has not been completed: completing the given block layer request and transmitting a notification that the given block layer request is completed; and when the database indicates that given block layer request has been completed, re-transmitting a notification that the given block layer request is completed.

20 Claims, 7 Drawing Sheets

| REQUEST ID |
|---|
| 000055 |
| 000039 |
| 000041 |
| 000042 |
| .... |
| 000078 |

| REQUEST ID | COMPLETION STATUS |
|---|---|
| 000055 | completed (granted) |
| 000039 | completed (granted) |
| 000099 | pending |
| 000041 | completed (denied) |
| 000029 | pending |
| 000042 | completed (granted) |
| .... | |
| 000078 | completed (granted) |

TRANSIENT SOFTWARE ERROR HANDLING IN A DISTRIBUTED SYSTEM

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method for use in a storage system is provided, the method comprising: receiving, at a first server in the storage system, a given block layer request for reservation of a storage resource, the given block layer request being received from a second server in the storage system; obtaining, by the first server, an identifier corresponding to the given block layer request; performing a search of a database to detect whether the given block layer request has been completed, the search being performed by the first server, the search being performed based on the identifier corresponding to the given block layer request; when the database indicates that the given block layer request has not been completed: completing the given block layer request, updating the database to indicate that the given block layer request has been completed, and transmitting, to the second server, a notification that the given block layer request is completed; and when the database indicates that given block layer request has been completed, re-transmitting, to the second server, a notification that the given block layer request is completed.

According to aspects of the disclosure, a system is provided comprising: a memory; and at least one processor operatively coupled to the memory, the at least one processor being configured to perform the operations of: receiving a given block layer request for reservation of a storage resource, the given block layer request being received from a server in a storage system; obtaining an identifier corresponding to the given block layer request; performing a search of a database to detect whether the given block layer request has been completed, the search being performed based on the identifier corresponding to the given block layer request; when the database indicates that the given block layer request has not been completed: completing the given block layer request, updating the database to indicate that the given block layer request has been completed, and transmitting, to the server, a notification that the given block layer request is completed; and when the database indicates that given block layer request has been completed, re-transmitting, to the server, a notification that the given block layer request is completed.

According to aspects of the disclosure, a non-transitory computer-readable storage medium is provided that is configured to store one or more processor-executable instructions, which, when executed by at least one processor, cause the at least one processor to perform the operations of: receiving a given block layer request for reservation of a storage resource, the given block layer request being received from a server in a storage system; obtaining an identifier corresponding to the given block layer request; performing a search of a database to detect whether the given block layer request has been completed, the search being performed based on the identifier corresponding to the given block layer request; when the database indicates that the given block layer request has not been completed: completing the given block layer request, updating the database to indicate that the given block layer request has been completed, and transmitting, to the server, a notification that the given block layer request is completed; and when the database indicates that given block layer request has been completed, re-transmitting, to the server, a notification that the given block layer request is completed.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

DETAILED DESCRIPTION

Before describing embodiments of the concepts, structures, and techniques sought to be protected herein, some terms are explained. In some embodiments, the term "I/O request" or simply "I/O" may be used to refer to an input or output request. In some embodiments, an I/O request may refer to a data read or write request.

Figure 1:
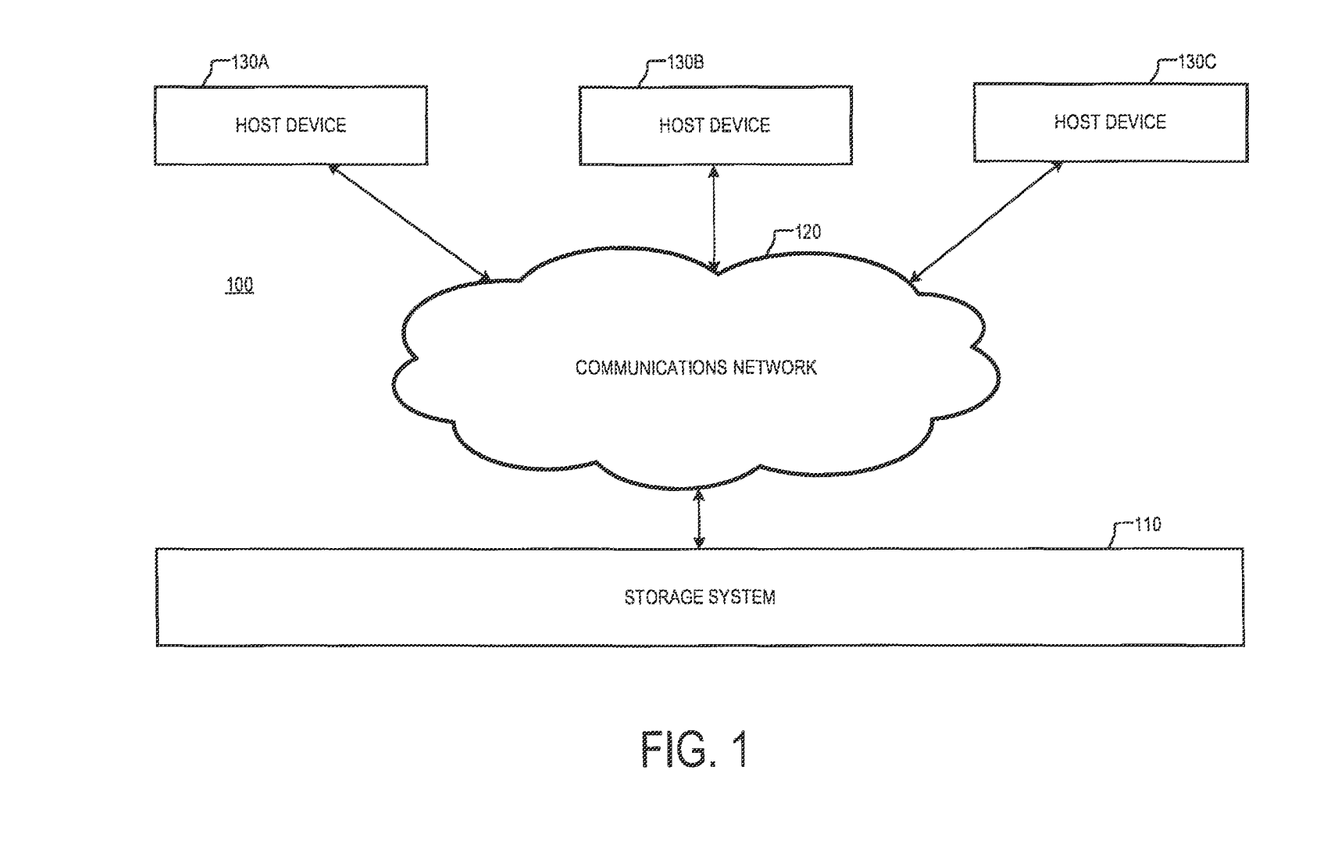
FIG. 1 is a diagram of an example of a system, according to aspects of the disclosure.

FIG. 1 is a diagram of an example of a system 100, according to aspects of the disclosure. The system 100 may include a storage system 110 that is coupled to one or more host devices 130 via a communications network 120. The storage system 110 may include a midrange storage system, an enterprise storage system, and/or any other suitable type of storage system. The communications network 120 may include a local area network (LAN), a wide area network (WAN), the Internet, and/or any or suitable type of communications network. Each of the host devices 130 may include a desktop computer, a laptop computer, a smartphone, a digital media player, and/or any other suitable type of electronic device.

Figure 2A:
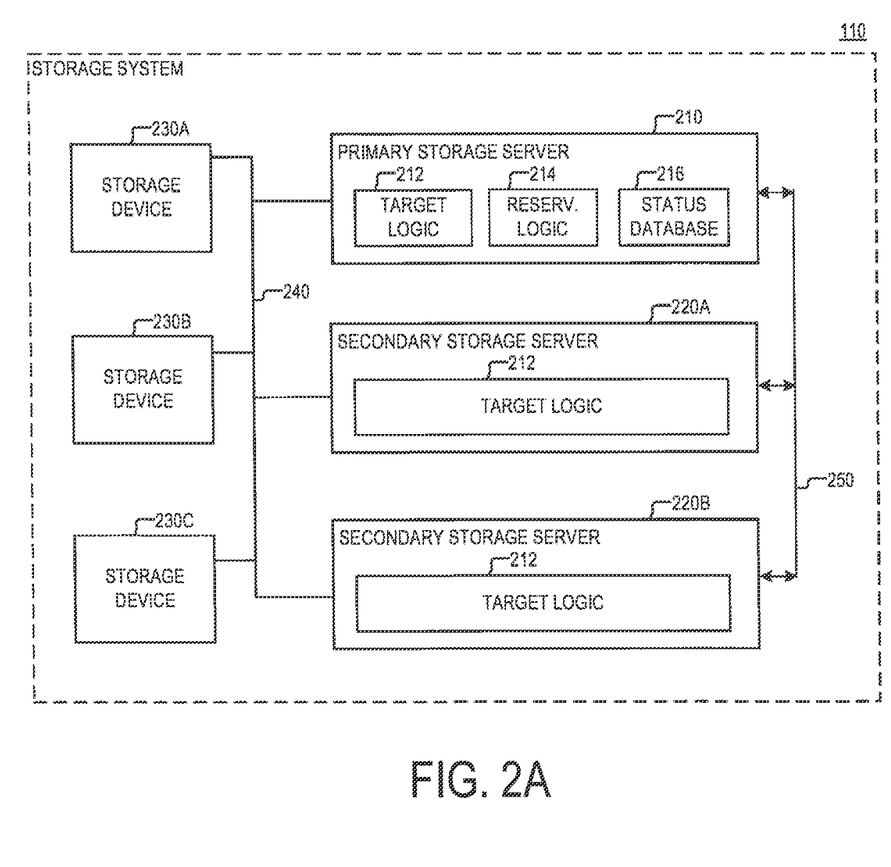
FIG. 2A is a diagram of an example of a storage system, according to aspects of the disclosure.

FIG. 2A illustrates an example of the storage system 110 according to aspects of the disclosure. As illustrated, the storage system 110 may include a primary storage server 210, a plurality of secondary storage servers, and a plurality of storage devices 230. The storage servers 210 and 220 may be coupled to the storage devices via a communications link 240. The storage servers 210 and 220 may be coupled to one another via a communications network 250. Each of the storage servers 210 and 220 may include a respective computing device, such as the computing device 500, which is discussed further below with respect to FIG. 5. Each of the storage devices 230 may include a solid-state drive (SSD), a non-volatile random-access memory (nvRAM), and/or any other suitable type of volatile and/or non-volatile storage device. The communications link 240 may include a fibre channel, a Small Computer Systems Interface (SCSI) bus, and/or any other suitable type of communications link. The communications network 250 may include an InfiniBand network, a TCP/IP network, and/or any other suitable type of communications network.

According to aspects of the disclosure, each of the primary storage servers 210 and 220 is configured to execute I/O requests by reading and writing data to the storage devices 230, but only the primary storage server 210 is capable of reserving the storage devices 230 for use by the host devices 130. The term "reservation," as used in relation to any of the host devices 130, may refer to a mechanism which allows any the host devices 130 to reserve the storage devices 230 for exclusive or non-exclusive use. In some implementations, when any of the storage device 230 is reserved for use by a particular host device 130, only that host device 130 may be permitted to access the storage device 230. In other implementations, however, the reservations may be non-exclusive. As used throughout the disclosure, the enumerators "primary" and "secondary", as applied in relation to storage servers, are used solely for the purpose of distinguishing the storage server in the storage system 110 that executes a reservation logic from all other storage servers.

In some implementations, the storage system 110 may be configured such that any of the host devices 130 would have to reserve a given storage device 230 before it is permitted to access the storage device 230. Any of the host devices 130 may reserve one of the storage devices 230 by transmitting a reservation request for the storage device 230 to one of the secondary storage servers 220, The reservation request may include a SCSI persistent reserve command, and/or any other suitable type of block-layer reservation request. The reservation request may identify the storage device either directly or indirectly. When the storage devices is identified indirectly, the storage devices may be referenced by using an identifier of a volume (or a logical unit) that is implemented on the storage device 230. Alternatively, when the storage device is identified directly, the storage device may be referenced in the request by using an identifier that corresponds to the hardware of the storage device.

In some implementations, the primary storage server 210 and each of the secondary storage servers 220 may be configured to execute a respective instance of a target logic 212, while only of the primary storage server 210 is configured to execute a reservation logic 214. According to the present example, the target logic 212 and the reservation logic 214 are implemented in software. However, alternative implementations are possible in which any of the target logic 212 and the reservation logic 214 is implemented in hardware or as a combination of software and hardware.

The target logic 212 may include logic for reading and writing data to the storage devices 230. The reservation logic 214 may include logic for executing reservation requests that are received at the primary storage server 210, In some implementations, the reservation logic 214 may at least in part include well-known logic for executing SCSI reservation commands. However, alternative implementations are possible in which the reservation logic 214 is configured to execute reservation commands that are formatted in accordance with another protocol. Stated succinctly, the present disclosure is not limited to any specific implementation of the reservation logic 214.

As noted above, in some implementations, the primary storage server 210 may be the only storage server in the storage system 110 that is provided with reservation logic 214, and configured to complete reservation requests as a result. Executing the reservation logic 214 on the primary storage server 210 only may ensure that the storage system 110 has a single point of decision-making with respect to all reservation requests (for storage devices 320a-c) that are received at the storage system 110. Having a single point of decision-making is advantageous as it may help reduce the likelihood of system errors resulting from improper synchronization of the states of different storage servers in the storage system 110. Although in the present example the primary storage server 210 is the only storage server in the storage system 110 that can execute reservation requests, the present disclosure is not limited thereto. In this regard, it will be understood that alternative implementations are possible in which different storage servers in the storage system 110 are configured to reserve (different or same) storage devices.

In some implementations, the primary storage server 210 may be configured to execute the reservation logic 214 in response to a reservation request that is generated within the storage system 110. After the server 210 executes the reservation logic (assuming that the reservation request is being granted), the reservation server 210 may broadcast the reservation details to all (or at least some) secondary storage servers 220 to ensure that all (or at least some) instances of the target logic 212 are configured consistently (with one another) across the storage system 110. The reservation details that are broadcast may include any suitable type of information relating to the reservation request, such as an identification of a storage device that is reserved, an identification of a host device for which the storage device is reserved, etc. Next, after the broadcast is completed, the primary storage server 210 may receive an acknowledgement from each of the secondary servers 220 (and/or from each instance of the reservation logic 212) indicating that its internal state has been updated correctly, And finally, after the primary storage server 210 has received an acknowledgement from each of the secondary storage servers 220, the primary storage server 210 may notify the originator of the reservation request that the reservation request has been granted.

Figure 2B:
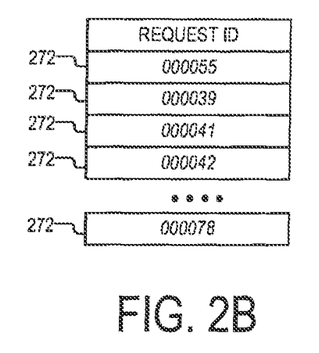
FIG. 2B is a diagram of an example of a status database, according to aspects of the disclosure.

In some implementations, the primary storage server 210 may be configured to maintain a status database 216. The status database 216 may include one or more data structures that indicate whether reservation requests that are received at the primary storage server 210 have been completed. The status database 216 may be stored in the memory of the primary storage server 210 and/or in the memory of another component of the storage system 110. In some implementations, the status database 216 may be persisted on a replication device that is associated with the primary storage server 210. In such implementations, if the primary storage server 210 crashes, the contents of the status database 216 can be restored without data loss when the primary storage server 210 is restarted. As is discussed further below, the status database 216 may be used to resume the execution of reservation requests that are interrupted as a result of the primary storage server 210 crashing or as a result of a network error. Persisting the status database 216 on a replication device may facilitate the resumption of reservation requests that are disrupted as a result of the primary storage server 210 experiencing a failure, as it would ensure that no data in the status database 216 is lost, FIG. 2B illustrates an example of the status database 216, in accordance with one implementation. In the implementation of FIG. 2B, the status database 216 may include a plurality of entries 272. Each entry 272 may include an identifier of a different reservation request that has been completed by the primary storage server 210. In the implementation of FIG. 5A, the status database 216 identifies only reservation requests that have been completed successfully (e.g., requests that have been granted).

Figure 2C:
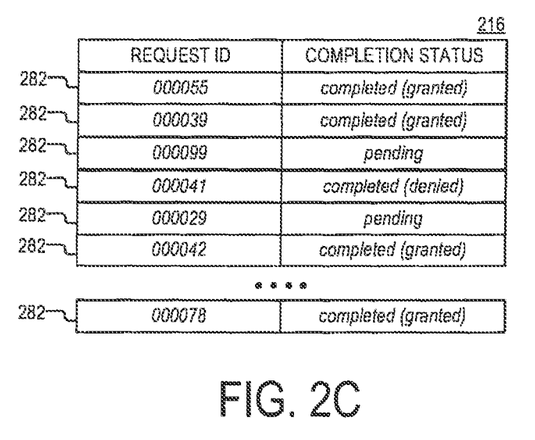
FIG. 2C is a diagram of another example of a status database, according to aspects of the disclosure.

FIG. 2C illustrates an example of the status database 216, in accordance with another implementation. In the implementation of FIG. 5B, the status database 216 may include a plurality of entries 282. Each entry 282 may include a different reservation request identifier, and a completion status identifier corresponding to the reservation request identifier. The reservation request identifier in any of the entries 282 may identify a respective reservation request that is received at the primary storage server 210. The completion status identifier in any of the entries 282 may include a string that indicates whether the entry's respective reservation request has been completed successfully by the primary storage server 210 or is still pending. For example, when the completion status identifier of a given entry 282 has a first value, this may indicate that the given entry's respective reservation request has been completed by the primary storage server 210. As another example, when the completion status identifier of the given entry 282 has a second value, this may indicate that the given entry's respective reservation request is still pending.

Figure 3:
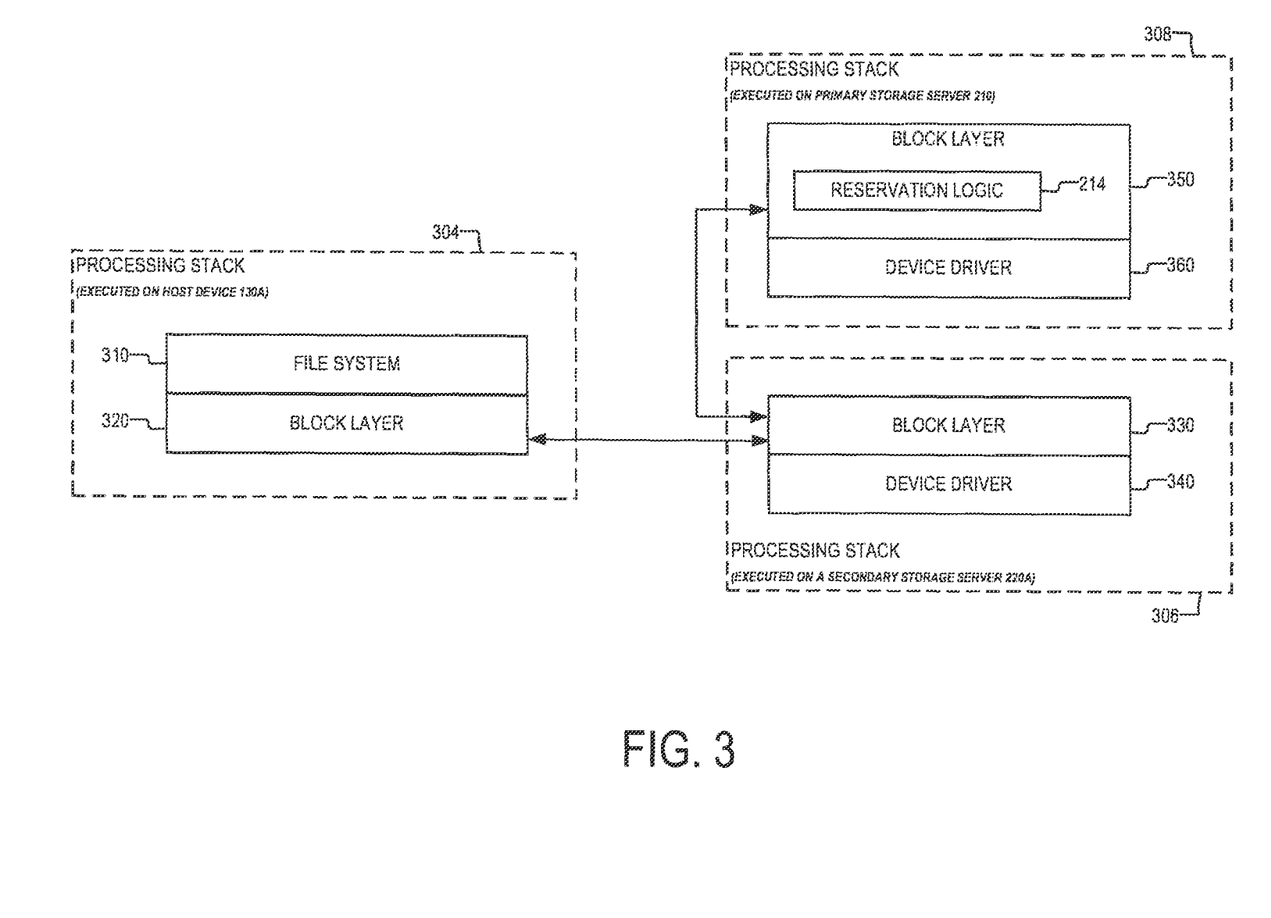
FIG. 3 is a block diagram illustrating a process for servicing reservation requests, according to aspects of the disclosure.

FIG. 3 is a diagram illustrating a process for executing a reservation request, according to aspects of the disclosure. FIG. 3 is provided for the purpose for illustrating that in some implementations, reservation requests may be executed in the block layer of the system 100.

Shown in FIG. 3 are a processing stack 304, a processing stack 306, and a processing stack 308. Processing stack 304 is executed on the host device 130a and it includes a file system 310 and a block layer 320. The file system 310 may be associated with a particular volume (and/or logical unit) in the storage system 110, and it may implement a data store for saving, retrieving, and updating files. According to the present example, the volume is implemented on the storage devices 230, The block layer 320 may include logic that handles requests (from the file system 310) to read or write data on storage devices 230.

Processing stack 306 is executed on the secondary storage server 220a. Processing stack 306 may include a block layer 330 and device driver 340. The block layer 330 may include logic that handles: (i) requests (from the block layer 320) to read or write data on storage devices 230, and (ii) requests (from the block layer 320) to reserve any of the storage devices 230 for use by the host device 130a. The device driver 340 may provide an interface, to the block layer 320, for interacting with the storage devices 230.

Processing stack 308 may be executed on the primary storage server 210. The processing stack may include a block layer 350 and a device driver 360, The block layer 350 may include logic that handles (i) requests (from the block layer 320) to read or write data on storage devices 230, (ii) and requests (from the block layer 330) to reserve any of the storage devices 230 for use by the host device 130a. In accordance with the present example, the block layer 350 includes the reservation logic 214. The device driver 360 may provide an interface, to the block layer 350, for interacting with the storage devices 230.

In operation, the block layer 320 may transmit to the block layer 330, a first reservation request. The first reservation request may be a request to reserve the storage device 230a for use by the host device 130a. Next, the block layer 330 may generate a second reservation request. The second reservation request may be generated based on the first reservation request. In this regard, the second reservation request may also be a request to reserve the storage device 230a for use by the host device 130a, Next, the block layer 330 may forward the second reservation request to the block layer 350. Next, the block layer 350 may execute the request by using the reservation logic 214, Next, the block layer 350 may transmit to the block layer 330 a second response to the second reservation request. And finally, the block layer 330 may generate a first response to the first reservation request, and transmit the first response to the host device 130a. The first response may be generated based on the second response. For example, if the second response indicates that the storage device 230 has been successfully reserved for use by the host device 130a, the first response my also indicate that the storage device 230a has been reserved for use by the host device 130a. Similarly, if the second response indicates that the request has been denied, the first response may also indicate the same.

The reservation logic 214 may execute the second reservation request in a well-known fashion. For example, in some implementations, the reservation logic 214 may use any suitable logic for executing SCSI reservation commands that is known in the art. Additionally or alternatively, in some implementations, when executing the second reservation request, the reservation logic 214 may identify the current state of the storage system 110 (hereinafter "first state") and determine whether to grant the request based on the current state of the storage system 110. If the reservation logic 214 decides to deny the second reservation request, the block layer 350 may generate a response indicating that the second reservation request is denied, an provide the response to the secondary storage server 220a, Otherwise, if the reservation logic 214 decides to grant the reservation request, the reservation logic 214 may attempt to transition the storage system from the first state into a second state. If the transition is successful, the reservation logic 214 may generate a response indicating that the second request is granted (i.e., a response indicating that the storage device 230a is now reserved for use by the host device 130a), and provide the response to the secondary storage server 220.

In some implementations, the second state may be a state in which each (or selected ones) of the storage servers in the storage system 110 is aware that the storage device 230a is reserved for use by the host device 130a. Transitioning the storage system 110 into the second state may include transmitting from the primary storage server 210, to each of the remaining storage servers in the storage system 110, a notification that the storage device 230a is being reserved for use by the host device 130a. In response to receiving the instruction, each of the remaining storage servers may: (i) update one or more local data structures to guarantee that the storage device 230a is not going to be accessed by other host devices, and (ii) transmit to the primary storage server 210 an acknowledgement that the one or more local data structures have been updated successfully. The remaining storage servers may include all (or at least some of) the storage servers in the storage system 110, except for the primary storage server 210 and the secondary storage server 220a. Afterwards, when the primary storage server 210 has received acknowledgements from all remaining storage servers, the primary storage server 210 may update a data structure that is stored in in the primary storage server 210 to indicate that the storage device 230a is now reserved for use by the host device 130a. And finally, the primary storage server 210 may transmit, to the secondary storage server 220a, a response indicating that the storage device 230a has been successfully reserved for use by the host device 130a.

While the second reservation request is executed, several transient errors may occur that would cause the second reservation request to fail. For example, the second reservation request may fail to reach the primary storage server 210 as a result of network error. As another example, the primary storage server 210 may crash and have to restart after transitioning the storage system into the second state (e.g., after the second reservation request is completed) and before transmitting, to the secondary storage server 220a, a response to the second reservation request. As yet another example, the response to the second reservation request may fail to reach the secondary storage server 220a as a result of a network error. As can be readily appreciated, all of these errors can cause the second reservation request to time out.

Figure 4A:
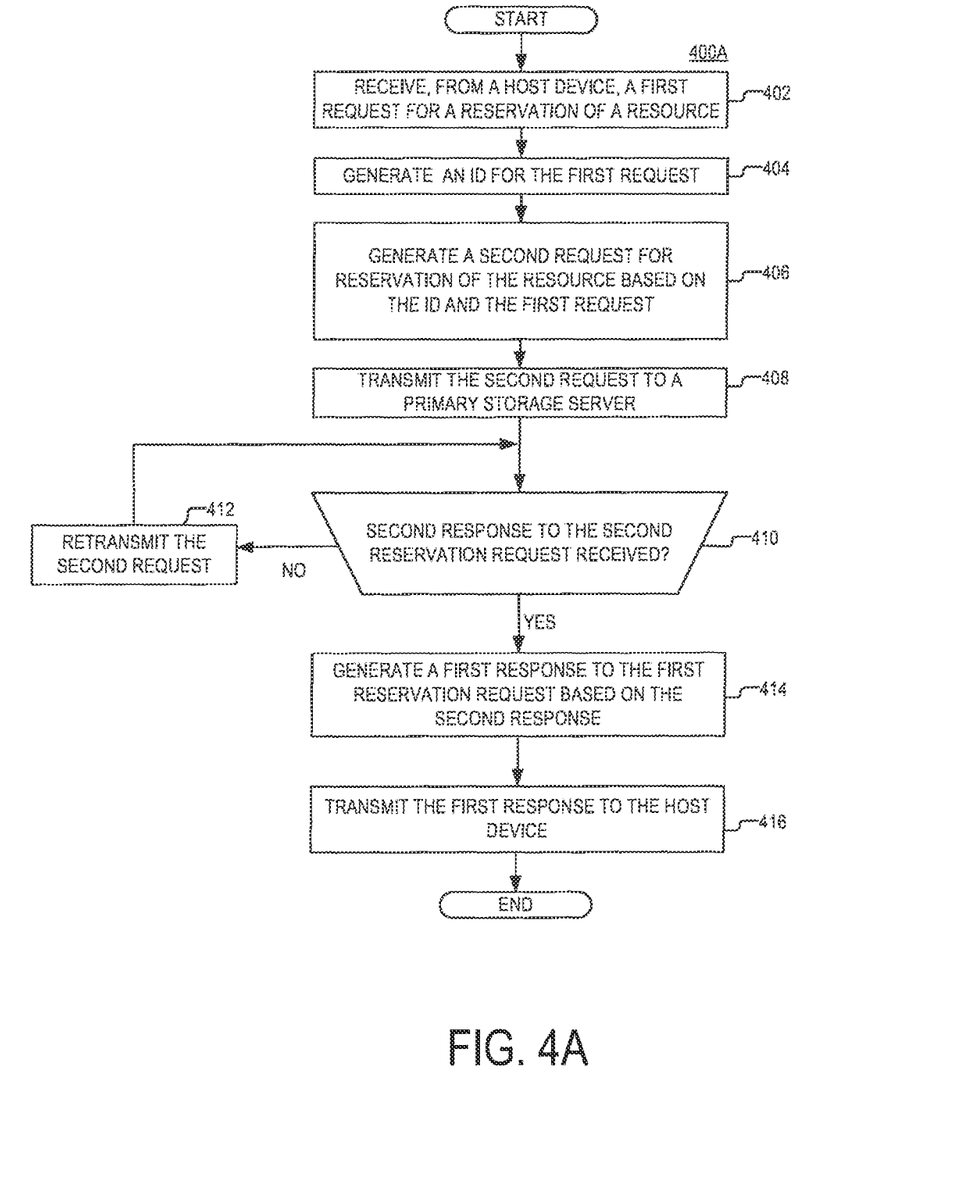
FIG. 4A is a flowchart of an example of a process, according to aspects of the disclosure.
Figure 4B:
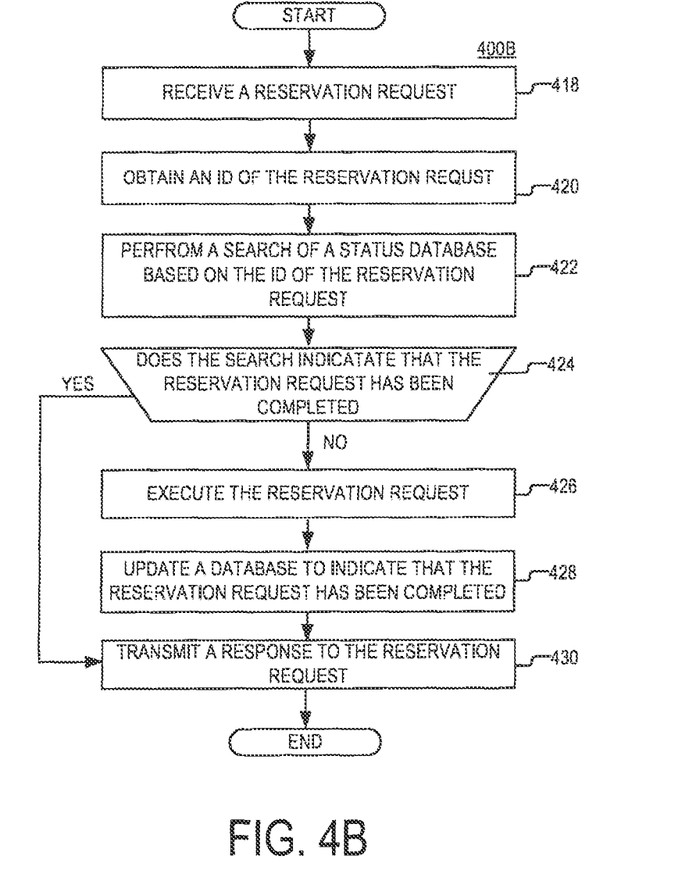
FIG. 4B is a flowchart of an example of a process, according to aspects of the disclosure.

The present disclosure provides a technique for handling such transient errors without having to execute the second reservation request twice. The technique is discussed further below with respect to FIGS. 4A and 4B. As noted above, the execution of the second reservation request is state-dependent In other words, if the storage system 110 is in the first state when the second reservation request is executed, the second reservation request may be granted. However, if the storage system is in the second state when the second reservation request is executed, the second reservation request may be denied. In other words, the second reservation request may not be able to be executed twice in a row with the same result. In some respects, the technique that is presented with respect to FIGS. 4A-B is advantageous because it allows the second reservation request to be finalized, when an error occurs, instead of being executed for a second time (with an unpredictable result). Under the nomenclature of the present disclosure, the second reservation request is considered finalized when the sender of the reservation request (i.e., the secondary storage server 220a) receives a response to the reservation request. On the other hand, the second reservation request is considered completed when the reservation logic 214 has finished processing the request and/or when the storage system is transitioned into a state in which the storage device that is the subject of the reservation request (e.g., the storage device 230a) is effectively reserved for use by the host device that is the initiator of the first reservation request (e.g., the host device 130a), FIG. 4A depicts an example of a process 400a for executing a reservation request. At step 402, the secondary storage server 220a receives, from the host device 130a, a first request to reserve the storage device 330a for use by the host device 130a (hereinafter "first reservation request"). The first reservation request may include a SCSI persistent reserve command and/or any other suitable type of reservation request. At step 404, the secondary storage server 220a generates an identifier for the first reservation request. At step 406, the secondary storage server 220a generates a second reservation request based on the first reservation request and the identifier. The second reservation request may include a request to reserve the storage device 230a for use by the host device 130a. The second reservation request may include a SCSI persistent reserve command and/or any other suitable type of block-layer reservation request. At step 408, the secondary storage server 220a transmits the second reservation request to the primary storage server 210. At step 410, the secondary storage server 210a determines whether a second response to the second reservation request has been received at the secondary storage server 220a before the expiration of timeout period. If the second response has been received, the process 400a proceeds to step 414. Otherwise, if the timeout period has expired before the second response is received, the process 400a proceeds to step 412. At step 412, the second reservation request is re-transmitted to the primary storage server 210. At step 414, the secondary storage server 220a generates a first response to the first reservation request based on the second response. At step 416, the secondary storage server 220a transmits the first response to the host device 130a.

In some implementations, the identifier (generated at step 406) may include any suitable type of number, string, or alphanumerical string that is capable of uniquely identifying the first reservation request among a plurality of reservation requests that are received at the secondary storage server 220a. Additionally or alternatively, in some implementations, the identifier may include any suitable type of number, string, or alphanumerical string that is capable of uniquely identifying the first reservation request among a plurality of reservation requests that are received at any storage server in the storage system. As can be readily appreciated, in the latter case, the identifier may be capable of uniquely identifying the first reservation request among all reservation requests that are received at the storage system (e.g., during a predetermined time period and/or since that last reboot of the storage system) and are still pending.

In some implementations, the second reservation request may be generated by inserting the identifier into the first reservation request—e.g., by tagging the first reservation request with the identifier. Additionally or alternatively, in some implementations, the second request may be generated by extracting request data from the first request, and instantiated a new request object that includes the request data and the identifier. The request data may include an identifier of the storage resource that is desired to be reserved and/or any other suitable type of data that is needed to complete the first reservation request. Stated succinctly, the present disclosure is not limited to any specific method for generating the second reservation request.

In some implementations, the first response may include at least some of the contents of the second response. For example, if the second response indicates that the storage device 230a has been successfully reserved for use by the host device 130a, the first response may also indicate that the storage device 230a has been reserved for use by the host device 130a, As another example, if the second response indicates that the second reservation request is denied, the first response may also indicate that the first reservation request is denied.

FIG. 4B is a flowchart of an example of a process 400B for executing a reservation request. The reservation request may be the same or similar to the reservation request that is generated at step 406 of the process 406a. At step 418, the primary storage server 210 receives a reservation request from the secondary storage server 220a, The reservation request, according to the present example, includes a request to reserve the storage device 230a for use by host device 130a. At step 420, the primary storage server 210 extracts the identifier of the second request. The extracted identifier may be the same or similar to the identifier discussed with respect to step 404 of the process 400a. At step 422, the primary storage server 210 performs a search of the status database 216 by using a search key that is based on the identifier of the reservation request. As a result of the search, the primary storage server 210 may obtain a set of search results. At step 424, the primary storage server 210 determines whether the reservation request has been completed based on the set of search results. When the request has not been completed, the set of search results may be empty or include a database entry (e.g., an entry 282) which indicates that the request has not been completed. When the request has been completed, the set of search results may include an entry (e.g., an entry 272 or an entry 282) indicating that the reservation request has been completed. If the reservation request has been completed, the process 400b proceeds to step 430. Otherwise, if the reservation request has not been completed, the process 400b proceeds to step 426.

At step 426, the primary storage server 210 executes the reservation request and generates a response to the reservation request. According to the present example, the primary storage server 210 executes the reservation request by using the reservation logic 214.

At step 428, the primary storage server 210 updates the status database 216 to indicate that the reservation request has been completed. In some implementations, updating the completion database may include generating a new entry based on the identifier of the reservation request, and adding the new entry to the status database 216. In some implementations, the new entry may be the same or similar to any of the entries 272 and 282, which are discussed above with respect to FIGS. 2B and 2C, respectively.

At step 430, the primary storage server 210 transmits the response to the reservation request to the secondary storage server 220a. The response to the reservation request may include a message indicating whether the reservation request is granted or denied. According to the present example, when the reservation request is granted, the storage device 230a is reserved for use by host device 130a.

In some implementations, the process 400b may be used to resume the reservation requests in the event of an error. Specifically, the process 400b may be used to respond to re-retransmissions of the reservation requests without having to execute the reservation request again, Consider a situation in which the response to the reservation request (transmitted at step 430) fails to reach the secondary storage server 220a, In this situation, the secondary storage server 220a will detect a timeout and re-transmit the request. Because the original request and the re-transmitted request have the same identifier, the primary storage server would be able to use the status database 216 to determine whether the reservation request has already been executed once. If the reservation request has been executed, the primary storage server 210 may transmit a response to the reservation request without executing the reservation request for a second time. As noted above, the process 400b is advantageous because it may not always be possible to successfully execute the reservation request for a second time, after it has been already executed once.

In the example of FIG. 4B, the status database 216 is updated when the reservation request is completed successfully. However, alternatively implementations are possible in which the status database 216 is also updated when the reservation request is completed unsuccessfully. In such implementations, the status database 216 may be updated by generating and adding to the status database 216 an entry that includes the identifier of the reservation request as well as a completion identifier that indicates whether the reservation request is completed successfully or unsuccessfully, According to the present example, the reservation request is completed successfully when the reservation request is granted, and unsuccessfully when the reservation request is denied.

Figure 5:
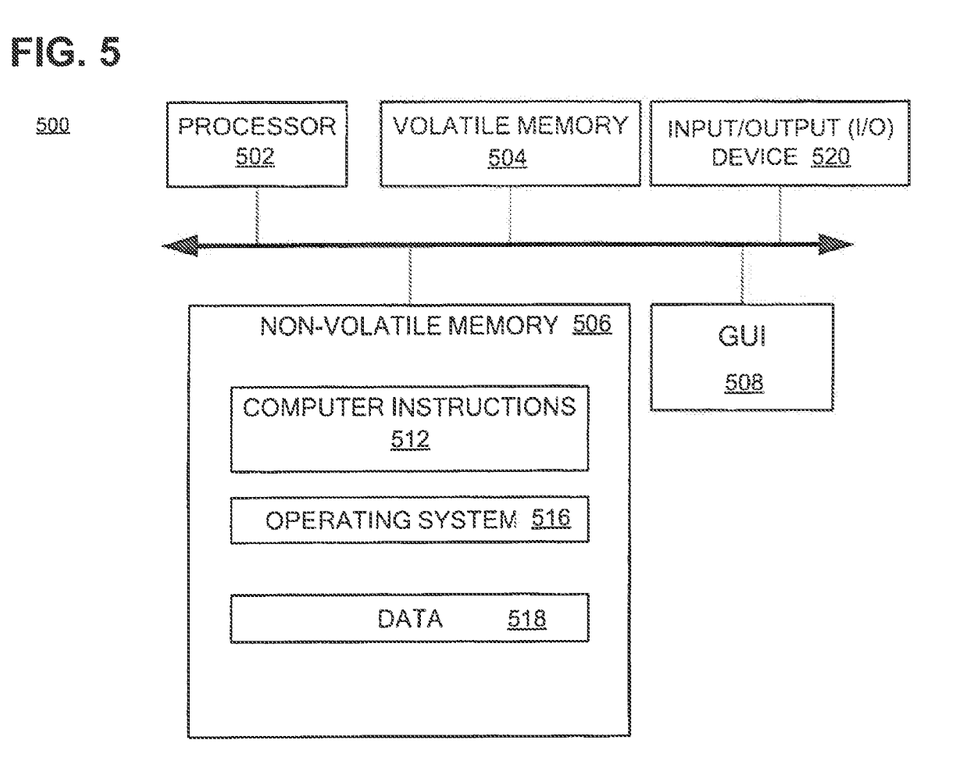
FIG. 5 is a diagram of an example of a computing device, according to aspects of the disclosure.

Referring to FIG. 5, in some implementations, any of the primary storage server 210 and/or the secondary storage servers 220 may be implemented as one or more computing devices 500. Each computing device 500 may include processor 502, volatile memory 504 (e.g., RAM), non-volatile memory 506 (e.g., a hard disk drive, a solid state drive such as a flash drive, a hybrid magnetic and solid state drive, etc.), graphical user interface (GUI) 508 (e.g., a touchscreen, a display, and so forth) and input/output (I/O) device 520 (e.g., a mouse, a keyboard, etc.). Non-volatile memory 506 stores computer instructions 512, an operating system 516 and data 518 such that, for example, the computer instructions 512 are executed by the processor 502 out of volatile memory 504 to perform at least a portion of the process 400A, process 400B, and/or any other function of the storage system 110.

FIGS. 1-5 are provided as an example only. At least some of the steps discussed with respect to FIGS. 1-5 may be performed in parallel, in a different order, or altogether omitted. As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program, Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method for use in a storage system, the method comprising:
 receiving, at a secondary server in the storage system, an external reservation request, the external reservation request being a request for reservation of a storage resource for use by a host device that is external to the storage system, the external reservation request being received from the host device, the external reservation request being a block-layer reservation request;
 generating, by the secondary server, an internal reservation request in response to the external reservation request, the internal reservation request being a request for reservation of the storage resource for use by the host device;
 transmitting the internal reservation request from the secondary server to a primary server in the storage system;
 receiving the internal reservation request at the primary server and obtaining, by the primary server, an identifier that is contained in the internal reservation request, the identifier uniquely identifying the external reservation request among a plurality of reservation requests that are received at the storage system;
 searching, by the primary server, a database to detect whether an earlier internal reservation request has been completed that is generated based on the same external reservation request as the received internal reservation request, the search being performed based on the obtained identifier;
 when the database indicates that the earlier internal reservation request has not been completed: completing the received internal reservation request, and transmitting, from the primary server to the secondary server, an indication of whether the storage resource is reserved for use by the host device; and
 when the database indicates that the earlier internal reservation request has been completed, re-transmitting, from the primary server to the secondary server, an indication of whether the storage resource is reserved for use by the host device.

2. The method of claim 1, wherein the received internal reservation request is completed by the primary server only when the database indicates that no earlier internal reservation request is completed that is generated based on the same external reservation request as the received internal reservation request.

3. The method of claim 1, wherein the internal reservation request is generated by inserting the identifier into the external reservation request, and the secondary server lacks privileges for reserving the storage resource directly.

4. The method of claim 1, wherein the identifier uniquely identifies the external reservation request among all block layer reservation requests that are received at the storage system during a predetermined period.

5. The method of claim 1, wherein:
the internal reservation request includes a Small Computer System Interface (SCSI) persistent reserve command, and
the database is configured to identify a plurality of reservation requests, the plurality of reservation requests including at least one of, (i) a request that has been completed, and (ii) a request that is pending.

6. The method of claim 1, wherein the database includes a plurality of entries, each entry mapping a different external reservation request identifier to a corresponding completion status identifier.

7. The method of claim 1, wherein the storage resource includes at least one of a solid-state drive (SSD), a non-volatile random-access memory (nvRAM), or a hard disk (HD).

8. A system comprising:
a memory; and
at least one processor operatively coupled to the memory, the at least one processor being configured to perform the operations of:
receiving an internal reservation request, the internal reservation request being a request for reservation of a storage resource in a storage system for use by a host device that is external to the storage system, the internal reservation request being received from a secondary server in the storage system, the internal reservation request being generated in response to an external reservation request for the storage resource that is received at the secondary server from the host device, the external reservation request being a block-layer reservation request;
obtaining an identifier that is contained in the internal reservation request, the identifier uniquely identifying the external reservation request among a plurality of reservation requests that are received at the storage system;
performing a search of a database to detect whether an earlier internal reservation request has been completed that is generated based on the same external reservation request as the received internal reservation request, the search being performed based on the obtained identifier;
when the database indicates that the earlier internal reservation request has not been completed: completing the received internal reservation request, and transmitting, to the secondary server, an indication of whether the storage resource is reserved for use by the host device; and
when the database indicates that the earlier internal reservation request has been completed, re-transmitting, to the secondary server, an indication of whether the storage resource is reserved for use by the host device.

9. The system of claim 8, wherein the received internal reservation request is completed only when the database indicates that no earlier internal reservation request is completed that is generated based on the same external reservation request as the received internal reservation request.

10. The system of claim 8, wherein the internal reservation request is generated by inserting the identifier into the external reservation request, and the secondary server lacks privileges for reserving the storage resource directly.

11. The system of claim 8, wherein the identifier uniquely identifies the external reservation request among all block layer reservation requests that are received at the storage system during a predetermined period.

12. The system of claim 8, wherein:
the internal reservation request includes a Small Computer System Interface (SCSI) persistent reserve command, and
the database is configured to identify a plurality of reservation requests, the plurality of reservation requests including at least one of: (i) a request that has been completed, and (ii) a request that is pending.

13. The system of claim 8, wherein the database includes a plurality of entries, each entry mapping a different external reservation request identifier to a corresponding completion status identifier.

14. The system of claim 8, wherein the storage resource includes at least one of a solid-state drive (SSD), a non-volatile random-access memory (nvRAM), or a hard disk (HD).

15. A non-transitory computer-readable storage medium that is configured to store one or more processor-executable instructions, which, when executed by at least one processor, cause the at least one processor to perform the operations of:
receiving an internal reservation request, the internal reservation request being a request for reservation of a storage resource in a storage system for use by a host device that is external to the storage system, the internal reservation request being received from a secondary server in the storage system, the internal reservation request being generated in response to an external reservation request for the storage resource that is received at the secondary server from the host device, the external reservation request being a block-layer reservation request;
obtaining an identifier that is contained in the internal reservation request, the identifier uniquely identifying the external reservation request among a plurality of reservation requests that are received at the storage system and are still pending;
performing a search of a database to detect whether an internal reservation request has been completed that is generated based on the same external reservation request as the received internal reservation request, the search being performed based on the identifier corresponding to the internal reservation request;
when the database indicates that the internal reservation request has not been completed: completing the received internal reservation request, and transmitting, to the secondary server, an indication of whether the storage resource is reserved for use by the host device; and
when the database indicates that the earlier internal reservation request has been completed, re-transmitting, to the secondary server, an indication of whether the internal reservation request is completed.

16. The non-transitory computer-readable storage medium of claim 15, wherein the received internal reservation request is completed only when the database indicates that no earlier internal reservation request is completed that is generated based on the same external reservation request as the received internal reservation request.

17. The non-transitory computer-readable storage medium of claim 15, wherein the internal reservation request is generated by inserting the identifier into the external reservation request, and the secondary server lacks privileges for reserving the storage resource directly.

18. The non-transitory computer-readable storage medium of claim 15, wherein the identifier uniquely identifies the external reservation request among all block layer reservation requests that are received at the storage system during a predetermined period.

19. The non-transitory computer-readable storage medium of claim 15, wherein:
 the internal reservation request includes a Small Computer System Interface (SCSI) persistent reserve command, and
 the database is configured to identify a plurality of reservation requests, the plurality of reservation requests including at least one of: (i) a request that has been completed, and (ii) a request that is pending.

20. The non-transitory computer-readable storage medium of claim 15, wherein the database includes a plurality of entries, each entry mapping a different external reservation request identifier to a corresponding completion status identifier.

* * * * *